United States Patent
Chae et al.

(10) Patent No.: US 9,961,722 B2
(45) Date of Patent: May 1, 2018

(54) CAMERA MODULE AND SYSTEM FOR PREVENTING OF DEW CONDENSATION IN CAMERA MODULE

(71) Applicant: LG Electronics Inc., Seoul (KR)

(72) Inventors: Dongwook Chae, Seoul (KR); Salkmann Ji, Seoul (KR); Hyungjoo Kang, Seoul (KR); Hyunjoon Kim, Seoul (KR); Samnyol Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/195,629

(22) Filed: Jun. 28, 2016

(65) Prior Publication Data

US 2017/0099700 A1    Apr. 6, 2017

(30) Foreign Application Priority Data

Oct. 5, 2015  (KR) .................. 10-2015-0139952

(51) Int. Cl.
| | | |
|---|---|---|
| *G02B 13/16* | (2006.01) | |
| *H04N 5/225* | (2006.01) | |
| *H05B 3/00* | (2006.01) | |
| *H05B 3/84* | (2006.01) | |
| *G03B 17/55* | (2006.01) | |

(Continued)

(52) U.S. Cl.
CPC ........... *H05B 3/0071* (2013.01); *G03B 17/55* (2013.01); *H04N 5/2252* (2013.01); *H04N 5/2253* (2013.01); *H04N 5/2254* (2013.01); *H04N 5/2257* (2013.01); *H05B 3/84* (2013.01); *G02B 7/026* (2013.01); *G02B 27/0006* (2013.01)

(58) Field of Classification Search
CPC ...... H05B 3/0071; H05B 3/84; H04N 5/2253; H04N 5/2252; H04N 5/225; H04N 5/2257; G03B 17/55; B60R 2300/806; B60R 11/04; G02B 7/026; G02B 27/0006
USPC ................ 348/335, 340, 345, 348, 350, 352
See application file for complete search history.

(56) References Cited

U.S. PATENT DOCUMENTS

| | | | |
|---|---|---|---|
| 2009/0213208 A1* | 8/2009 | Glatt ...................... | G03B 37/00 348/36 |
| 2012/0170119 A1 | 7/2012 | Chu et al. | |

(Continued)

FOREIGN PATENT DOCUMENTS

| | | |
|---|---|---|
| EP | 1626583 A1 | 2/2006 |
| JP | 6-37802 U | 5/1994 |

(Continued)

*Primary Examiner* — Yogesh Aggarwal
(74) *Attorney, Agent, or Firm* — Birch, Stewart, Kolasch & Birch, LLP

(57) ABSTRACT

The present disclosure relates to a camera module, and a dew condensation prevention system of the camera module, and there is disclosed a camera module including a lens assembly; a lens barrel in a cylindrical shape with a predetermined height configured to accommodate the lens assembly; and a heat radiation member formed along an outer surface of the lens barrel to transfer heat to an outermost lens of the lens assembly, wherein the lens assembly has a field-of-view region formed in a first direction and a second direction crossed with the first direction, and at least one of the first and the second field of view is above 180 degrees, and a dew condensation prevention system using the same.

18 Claims, 15 Drawing Sheets

(51) Int. Cl.
*G02B 7/02* (2006.01)
*G02B 27/00* (2006.01)

(56) References Cited

U.S. PATENT DOCUMENTS

| | | |
|---|---|---|
| 2015/0036037 A1 | 2/2015 | Reed |
| 2015/0160536 A1 | 6/2015 | Lang et al. |
| 2015/0341555 A1* | 11/2015 | Artonne ................. G03B 37/00 |
| | | 348/36 |

FOREIGN PATENT DOCUMENTS

| | | | |
|---|---|---|---|
| JP | 2004-325603 A | | 11/2004 |
| JP | 2010069217 A | * | 4/2010 |
| JP | 2013-242364 A | | 12/2013 |
| KR | 20-0333530 Y1 | | 11/2003 |
| KR | 10-1064666 B1 | | 9/2011 |

* cited by examiner

CAMERA MODULE AND SYSTEM FOR PREVENTING OF DEW CONDENSATION IN CAMERA MODULE

CROSS-REFERENCE TO RELATED APPLICATIONS

Pursuant to 35 U.S.C. § 119(a), this application claims the benefit of earlier filing date and rights of priority to Korean Application No. 10-2015-0139952, filed on Oct. 5, 2015 the contents of which is incorporated by reference herein in its entirety.

BACKGROUND OF THE INVENTION

1. Field of the Invention

The present disclosure relates to a camera module for preventing dew condensation from being generated and a dew condensation prevention system using the same.

2. Description of the Related Art

At present, a camera performs the role of a key component in association with autonomous driving technologies in automobiles. However, technologies up to the present have been actively carried out for technological developments associated with the recognition of surrounding environments such as vehicle driving persons, things, and the like, and thus camera technology developments in consideration of the external conditions (dew condensation, droplets, etc.) of a vehicle are required.

In the related art, patent technologies associated with the dew condensation prevention of a camera have been applied to surveillance cameras, refrigerators, and the like, but have not been applied to cameras for vehicles.

In particular, an around view monitoring (AVM) camera for capturing the environment of a vehicle uses a number of wide-angle cameras for the parking assistance of the vehicle. Contrary to the surveillance cameras, cameras for refrigeration and other cameras for automobiles, the AVM camera has a field of view (FOV) above 180 degrees and thus requires to have a heat transfer structure capable of efficiently preventing or removing dew condensation without exerting influence on the field of view.

FIG. 1 is a schematic view illustrating a typical camera module 10 for capturing a field of view, and FIG. 2 is a perspective view illustrating a cover 20 of a camera for capturing a field of view in the related art. As illustrated in FIG. 1, the camera module 10 has a structure in which a lens barrel 12 for accommodating a lens assembly 11 is supported by a support 15.

Here, when the field of view of the AVM camera exceeds 180 degrees, the camera module 10 may be covered by a glass cover 20 formed with a heating wire 21 to remove dew condensation formed on the outermost lens thereof.

However, in such a case, the heating wire 21 may be likely captured by the camera module 10. Furthermore, the AVM camera for vehicles may have a simple structure for which heat transfer efficiency is not considered or may be exposed to various environments that can occur during the driving and parking of vehicles, thus requiring a heat transfer structure capable of preventing and/or removing dew condensation generation due to external environmental factors.

SUMMARY OF THE INVENTION

An object of the present disclosure is to solve the foregoing problem and other problems. Another object of the present disclosure is to provide a camera module having a structure capable of effectively transferring heat to an outermost lens of the camera module.

In order to accomplish the above and other objects, according to an aspect of the present disclosure, there may be provided a camera module including a lens assembly; a lens barrel in a cylindrical shape with a predetermined height configured to accommodate the lens assembly; and a heat radiation member formed along an outer surface of the lens barrel to transfer heat to an outermost lens of the lens assembly, wherein the lens assembly has a field-of-view region formed in a first direction and a second direction crossed with the first direction, and at least one of the first and the second field of view is above 180 degrees.

According to an aspect of the present invention, a size of the first field of view may be equal to or greater than that of the second field of view.

According to an aspect of the present invention, the heat radiation member may be formed adjacent to an outer side of the field-of-view region.

According to an aspect of the present invention, the heat radiation member may be formed adjacent to an outer side of a field-of-view region formed along a first and a second direction.

According to an aspect of the present invention, the heat radiation member may be formed adjacent to an outer side of a field-of-view region formed along the second direction.

According to an aspect of the present invention, a heat transfer metal body for transferring the heat of the heat radiation member to the outermost lens may be further provided at an inner or outer side of the heat radiation member.

According to an aspect of the present invention, when the heat transfer metal body is provided at an outer side of the heat radiation member, a bump may be formed at an inner side of the heat transfer metal body, and the bump may be inserted into a hollow portion formed at the center of the heat radiation member.

According to an aspect of the present invention, the heat transfer metal body may be exposed on an outside while surrounding an outside of the heat radiation member.

According to an aspect of the present invention, a protrusion portion may be formed on the heat transfer metal body to cover an outer side of the second field-of-view region.

According to an aspect of the present invention, when the heat transfer metal body is provided at an inside of the heat radiation member, a bump may be formed on the heat transfer metal body, and the bump may be inserted into a hollow portion formed at the center of the heat radiation member.

According to an aspect of the present invention, a protrusion portion may be formed on the heat transfer metal body to cover an outer side of the second field-of-view region.

According to an aspect of the present invention, the camera module may further include a heat radiation member cover exposed on an outside while surrounding an outside of the heat radiation member, wherein the heat radiation member cover is formed with a protrusion portion extended and formed toward the center of an outermost lens to cover the outermost lens from the heat radiation member cover.

According to an aspect of the present invention, the protrusion portion may be formed at an outer side of the second field-of-view region.

According to an aspect of the present invention, an air gap may be formed between the lens barrel and the heat transfer metal body.

According to an aspect of the present invention, the heat radiation member may be connected to a circuit board provided within the camera module by a connection cable to receive power.

According to an aspect of the present invention, the heat radiation member may be a heating coil.

According to an aspect of the present invention, there may be provided a dew condensation prevention system of a camera module, and the dew condensation prevention system may include a camera module provided with a temperature sensor that measures a temperature of an outermost lens and a heat radiation member that transfers heat to the outermost lens; a body mounted with the camera module, and provided with a temperature/humidity sensor; and a controller configured to control the camera module, wherein the controller calculates a dew point temperature (Tdew) at a second temperature by a first temperature (T1) and a first humidity (H1) obtained from the temperature/humidity sensor, and the second temperature (T2) obtained by the temperature sensor to determine whether to operate the heat radiation member.

According to an aspect of the present invention, whether to operate the heat radiation member may be determined by comparing and judging a difference ($\Delta T$) between the second temperature (T2) and the dew point temperature (Tdew) and a preset temperature difference ($\Delta T$target).

According to an aspect of the present invention, the heat radiation member may operate when the difference ($\Delta T$) between the second temperature (T2) and the dew point temperature (Tdew) is greater than the preset temperature difference ($\Delta T$target), and the heat radiation member may not operate when the difference ($\Delta T$) is less than the preset temperature difference ($\Delta T$target).

According to at least one of the embodiments of the present disclosure, the present disclosure may have an advantage capable of preventing dew condensation from being generated on a lens provided at an outermost position or removing dew condensation that has already been generated.

Furthermore, according to at least one of the embodiments of the present disclosure, a heat radiation member may be disposed adjacent to a portion with a small field of view, thereby having an advantage capable of preventing an effect from being exerted on wide-angle capture.

Furthermore, according to at least one of the embodiments of the present disclosure, a cover surrounding a camera module may be extended adjacent to an outer side of the field-of-view region, thereby having an advantage capable of enhancing heat transfer efficiency.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Hereinafter, embodiments associated with the camera module 100 will be described with reference to the attached drawings. It should be understood by those skilled in the art that the present invention can be embodied in other specific forms without departing from the concept and essential characteristics thereof.

Figure 1:
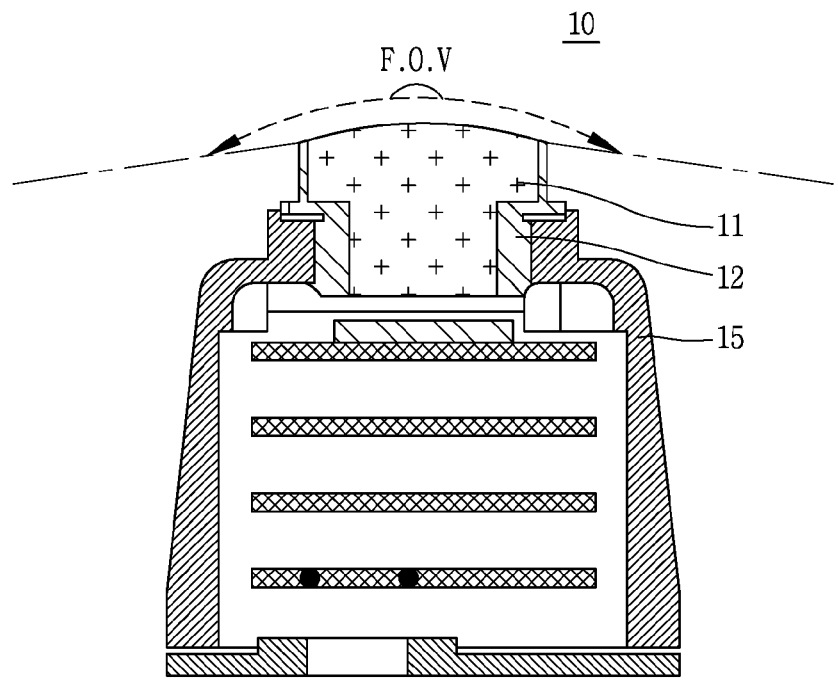
FIG. 1 is a cross-sectional view illustrating a camera for wide-angle capture.
Figure 2:
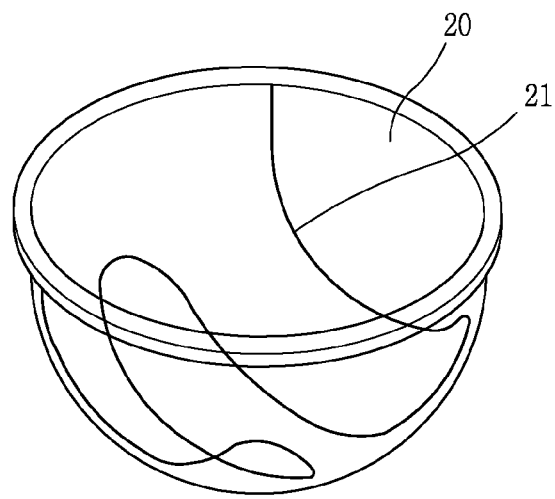
FIG. 2 is a perspective view illustrating a cover that covers a camera module in the related art.
Figure 3A:
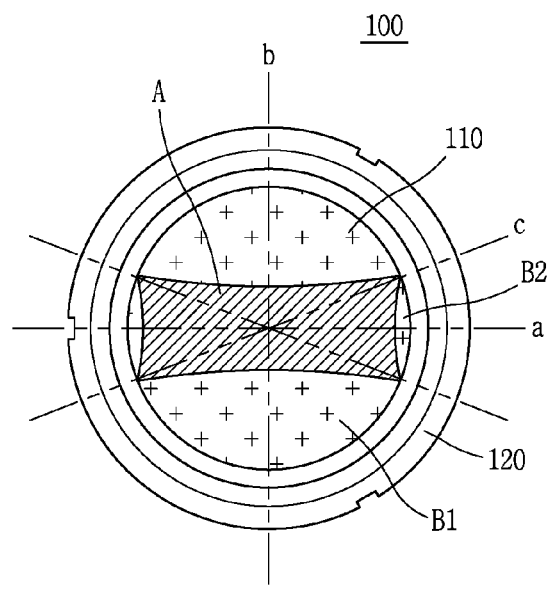
FIGS. 3A and 3B are views for explaining a field-of-view region of a camera module according to an embodiment of the present disclosure.
Figure 3B:
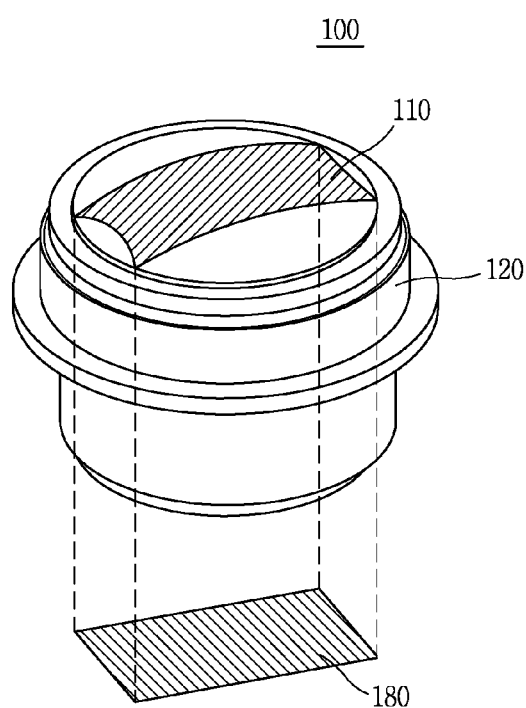
Figure 4:
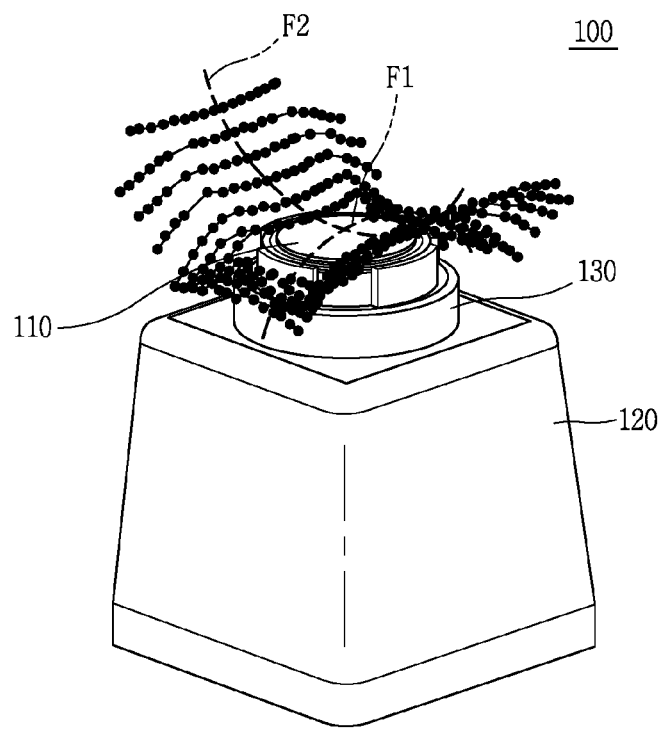
FIG. 4 is a view for explaining a field of view of a camera module according to an embodiment of the present disclosure.

First, FIGS. 3A and 3B are a plan view and a perspective view of the camera module 100 according to an embodiment of the present disclosure, and FIG. 4 is a perspective view of the camera module according to an embodiment of the present disclosure, and FIGS. 3A, 3B and 4 are views for explaining a field of view according to an embodiment of the present disclosure.

Referring to FIGS. 3A through 4, when a field of view (FOV) above 180 degrees is captured, a lens assembly 110 formed by a combination of plurality of lenses may be provided at an upper side of the camera module 100, and dew condensation may be formed on an outermost lens 111 disposed at an outermost position of the lens assembly 110.

A region of converting light passing through the lens assembly 110 into electrical signals is restricted by an image sensor 180 provided at a lower portion of the lens assembly 110 to convert optical signals passing through the lens assembly 110 into electrical signals. For example, as illustrated in FIG. 3A, a vertical field of view may be different from a horizontal field of view. Hereinafter, a field of view captured along a horizontal direction (direction of axis a) is referred to as a horizontal field of view, and a field of view captured along a vertical direction (direction of axis b) is referred to as a vertical field of view, and a field of view captured in a diagonal direction (direction of axis c) is referred to as a diagonal field of view.

In other words, a partial region (B1, B2) of a region in which light is incident through the outermost lens 111 is cut during an image processing process without being transferred to the image sensor 180. Here, a region formed by the vertical field of view and horizontal field of view becomes a lens effective surface, and the lens effective surface varies according to a shape of the image sensor 180. For example, as illustrated in FIG. 3B, when the image sensor 180 has a rectangular shape, the horizontal field of view and vertical field of view are different from each other to correspond to the shape of the image sensor 180, and either one thereof is greater than the other one thereof.

It is mostly used when not required to capture the entire field of view when capturing a specific direction. For an example, when the camera module 100 is mounted on a vehicle 300 to capture surrounding backgrounds during driving or parking, they should be captured at the maximum wide angle in a horizontal direction to see all the things located in the surrounding, but such a large field of view is not required in a vertical direction. In particular, an upper portion of the vehicle 300 is not a driver's major direction of interest during driving or parking, and also is not an obstacle to his or her driving, and thus is not his or her region of interest. Accordingly, in most cases, an AVM camera provided in the vehicle 300 has a large horizontal field of view but a small vertical field of view. If both the vertical field of view and horizontal field of view have a wide angle above 180 degrees, then it has an advantage capable of capturing the maximum wide area in the vicinity of the vehicle 300, but requires a long time to process images by the image sensor 180, thus increasing a time required to show the captured images. In particular, it is more critical in case of an autonomous car (self-driving car) or cruise control.

If the image sensor 180 has a rectangular shape, the horizontal field of view and vertical field of view may have the same size.

Furthermore, when a region transmitted to an image sensor within a region of the lens assembly 110 is referred to as a field-of-view region (A), and a region that is not transmitted to an image sensor within a region of the lens assembly 110 is referred to as an field-of-view outside region, the field-of-view outside region may include an outside region (B2) of the horizontal field of view and an outside region (B1) of the vertical field of view. It is seen in FIGS. 3A and 3B that the outside region (B1) of the vertical field of view is larger than that of the outside region (B2) of the horizontal field of view.

Furthermore, FIG. 4 is a view showing a region (field of view) in which an image associated with an embodiment of the present disclosure is captured, wherein it is illustrated a case where the horizontal field of view (F1) is above 180 degrees and the vertical field of view (F2) is 140-150 degrees. As illustrated in FIG. 4, in case of the vertical field of view (F2), a vacant space is provided in a portion of the lens barrel 120 for accommodating the lens assembly 110.

Figure 5:
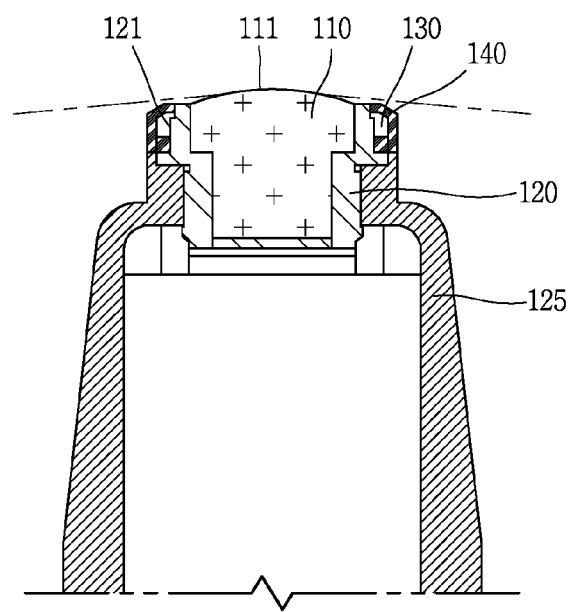
FIG. 5 is a cross-sectional view illustrating a camera module according to an embodiment of the present disclosure.

FIG. 5 is a cross-sectional view illustrating a camera module 100 according to an embodiment of the present disclosure. Referring to FIG. 5, according to an embodiment of the present disclosure, a heat radiation member 130 is provided on an outer circumferential surface 121 of the lens barrel 120 in a contact or non-contact manner, and heat due to the heat radiation member 130 is transferred to the outermost lens 111 to prevent dew condensation from being generated on the outermost lens 111 or remove dew condensation that has been already formed. Dew condensation at this time may be applicable to a case where the formation of dew condensation is not prevented since the camera module 100 is not operated when a body mounted with the camera module 100, such as a vehicle, is not driven. The heat radiation member 130 according to an embodiment of the present disclosure may not be necessarily limited to a specific type, but hereinafter, a case where the heat radiation member 130 is a heating coil will be mainly described.

The camera module 100 according to an embodiment of the present disclosure may include the lens assembly 110 formed by a combination of a plurality of lenses, the lens barrel 120 with a predetermined height configured to accommodate camera module 100 and surround the lens assembly 100, and the heat radiation member 130 formed along an outer circumferential surface 121 of the lens barrel 120 to transfer heat to the outermost lens 111 of the lens assembly 110. Here, the camera module 100 may be preferably formed along a vertical direction of the lens barrel 120 for accommodating the lens assembly 110. It is because the foregoing formation is advantageous to an adhesion structure of the heat radiation member 130. Here, the heat radiation member cover 140 formed on an outside to surround the heat radiation member 130 is provided at an outer portion of the heat radiation member 130, and the lens barrel 120 and cover 140 has a structure of being supported by the support 125.

Hereinafter, a case where the camera module 100 according to an embodiment of the present disclosure is mounted and used on the vehicle 300 will be mainly described. However, the present disclosure may not be necessarily limited to this, and may be also applicable to a case of a wide-angle camera used for electric products such as a typical surveillance camera or refrigerator as well as a camera having a typical field of view. Furthermore, the lens assembly 110 for wide-angle capture is mostly provided with a case where the outermost lens 111 is exposed toward an outside, and thus an upper surface of the lens barrel 120 should be formed in a downward direction from a position lower than an edge of the outermost lens 111 exposed to an outside. In other words, the lens barrel 120 and heat radiation member 130 should be formed below a dotted line illustrated in FIG. 5. It is not to hide an eyesight when the camera module 100 performs a wide-angle capture above 180 degrees.

The lens assembly 110 may have a first field of view along a first direction and a second field of view along a second direction crossed with the first direction, and at least one of the first and the second field of view is above 180 degrees, and a size of the first field of view is equal to or greater than that of the second field of view. Here, the first field of view may be a horizontal field of view, and the second field of view may be a vertical field of view. Hereinafter, it will be described on the assumption that the first field of view is a horizontal field of view, and the second field of view is a vertical field of view.

As illustrated in FIG. 5, the camera module 100 according to an embodiment of the present disclosure is formed such that the lens assembly 110 provided on an upper end thereof is surrounded by the lens barrel 120 in a cylindrical shape therewithin, and the lens barrel 120 has a predetermined length in a vertical direction. The heat radiation member 130 is provided on an outer circumferential surface 121 of the lens barrel 120. The heat radiation member 130 according to an embodiment of the present disclosure may be disposed in various structures, and it will be described with reference to FIGS. 10A through 10F.

Figure 10A:
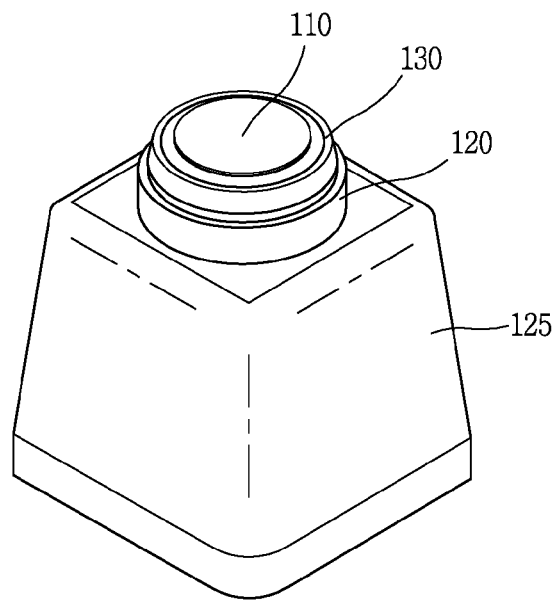
FIGS. 10A through 10F are schematic perspective views illustrating a camera module according to an embodiment of the present disclosure.
Figure 10B:
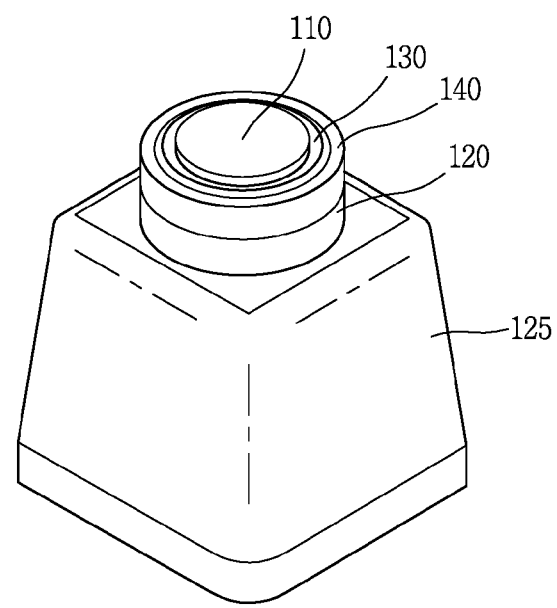
Figure 10C:
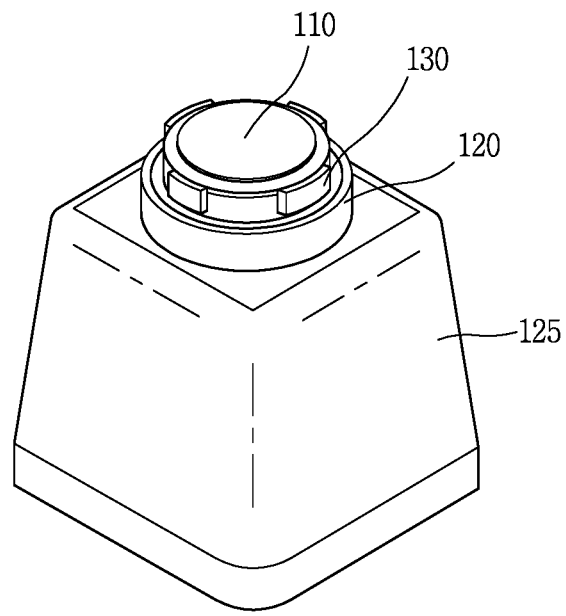
Figure 10D:
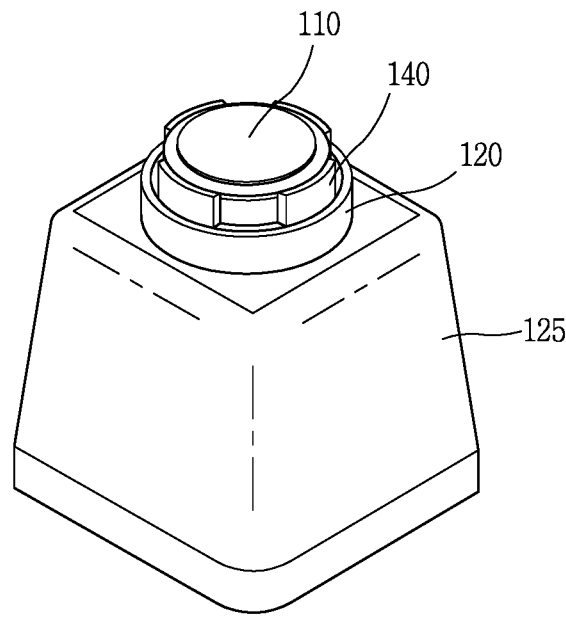
Figure 10E:
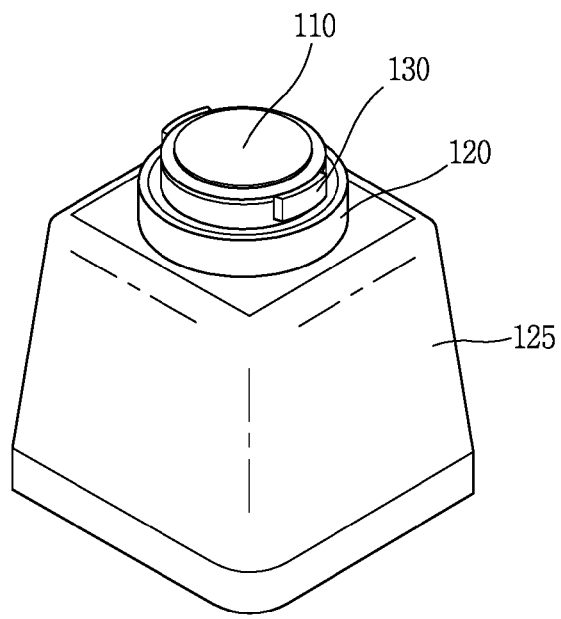
Figure 10F:
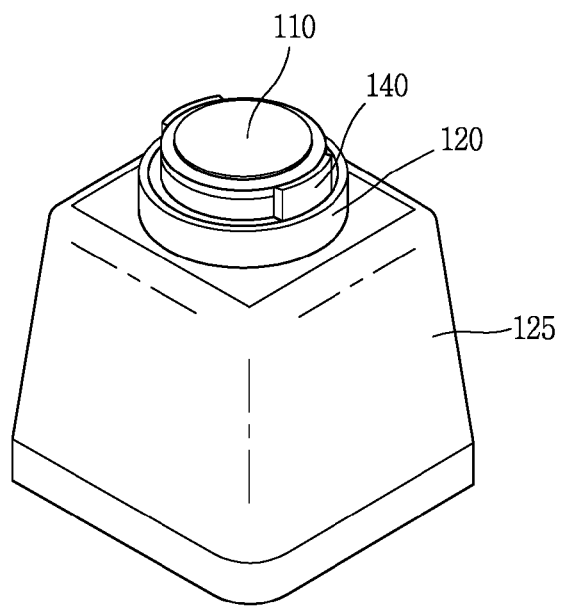

FIGS. 10A through 10F are schematic perspective views illustrating the camera module 100 according to an embodiment of the present disclosure, wherein FIGS. 10A and 10B are examples in which the heat radiation member 130 is formed toward the whole direction (360 degrees) along an edge 121 of the lens barrel 120, and FIGS. 10C and 10D are examples in which the heat radiation member 130 is formed at intervals of 90 degrees along an edge 121 of the lens barrel 120, and FIGS. 10E and 10F are examples in which the heat radiation member 130 is formed at intervals of 180 degrees on an edge 121 of the lens barrel 120.

FIG. 10A illustrates a view in which the heat radiation member 130 is formed in the whole direction along the edge 121, and FIG. 10B illustrates a view in which the heat radiation member 130 illustrated in FIG. 10A is surrounded by the heat radiation member cover 140. As described above, when the heat radiation member 130 is formed in the whole direction along the edge 121 of the lens barrel 120, heat may be transferred in the whole direction toward the outermost lens 111, thereby having an advantage capable of more quickly preventing or removing dew condensation. However, it may occur a case where an eyesight is blocked when a horizontal direction is captured by the heat radiation member cover 140. Accordingly, as illustrated in FIG. 5, the heat radiation member cover 140 should be formed below an exposure surface of the outermost lens 111. As described above, the heat radiation member 130 is configured in a cylindrical shape in the most approximate manner within a range of preventing an effect from being exerted on the horizontal field of view, but it has a disadvantage of reducing heat transfer efficiency due to an increase of a distance to the outermost lens 111, as well as increasing power supplied to the heat radiation member 130 due to the formation along the whole direction.

On the other hand, contrary to FIG. 10A, FIG. 10C illustrates a view in which the heat radiation member 130 is disposed at intervals of 90 degrees along the edge 121, and FIG. 10D illustrates a view in which the heat radiation member 130 illustrated in FIG. 10C is surrounded by the heat radiation member cover 140 having a shape corresponding to the heat radiation member 130. In other words, in FIGS. 10C and 10D, the heat radiation member is formed around a region adjacent to the outside region (B2) of the horizontal field of view and the outside region (B1) of the vertical field of view or those regions (B1, B2), thereby having an advantage capable of reducing power consumption compared to the cases of FIGS. 10A and 10B. Furthermore, when a size of the heat radiation member 130 disposed in the outside region (B1) of the vertical field of view or a region adjacent to the region (B1) is disposed to be larger than that of the heat radiation member 130 disposed in the outside region (B2) of the horizontal field of view or a region adjacent to the region (B2), it may be possible to more effectively transfer heat to the lens assembly 110. Here, the heat radiation member 130 and heat radiation member cover 140 are disposed at intervals of 90 degrees.

Moreover, FIG. 10E is a view in which the heat radiation member 130 is disposed at intervals of 180 degrees along the edge 121 of the lens barrel 120, and FIG. 10F is a view in which the heat radiation member 130 in FIG. 10E is surrounded by the heat radiation member cover 140 in a shape corresponding to the heat radiation member 130. In FIGS. 10E and 10F, the formation region of the heat radiation member 130 is further reduced contrary to FIGS. 10C and 10D. In other words, according to an embodiment of the present disclosure, since the horizontal field of view is larger than the vertical field of view, the formation region of the heat radiation member 130 is minimized not to prevent a region corresponding to the vertical field of view from being captured. In other words, as illustrated in FIG. 4, since a size of the field of view is about 140-150 degrees when capturing a region corresponding to the vertical field of view, there may exist a portion that is not captured by the edge 121 of the lens barrel 120. FIGS. 10E and 10F are views in which such a region is utilized. In other words, the heat radiation member 130 and heat radiation member cover 140 are disposed in the outside region (B1) of the vertical field of view and adjacent to the region (B1).

FIGS. 10E and 10F illustrate a scheme of minimizing the arrangement region and power consumption of the heat radiation member 130, but do not exclude a method illustrated in FIGS. 10A through 10D.

On the other hand, the lens assembly 110 according to an embodiment of the present disclosure is formed in a circular shape, and thus a distance between both end portions of the horizontal field of view is larger than that of both end portions of the vertical field of view. As illustrated in FIGS. 10E and 10F, when the heat radiation member 130 is formed in the outside region (B1) of the vertical field of view or adjacent to the region (B1) within the lens assembly 110, it is required a scheme for effectively transfer heat to a long distance along the axis b of FIG. 3A. To this end, an embodiment of the present disclosure proposes a heat transfer metal body 170.

Figure 7:
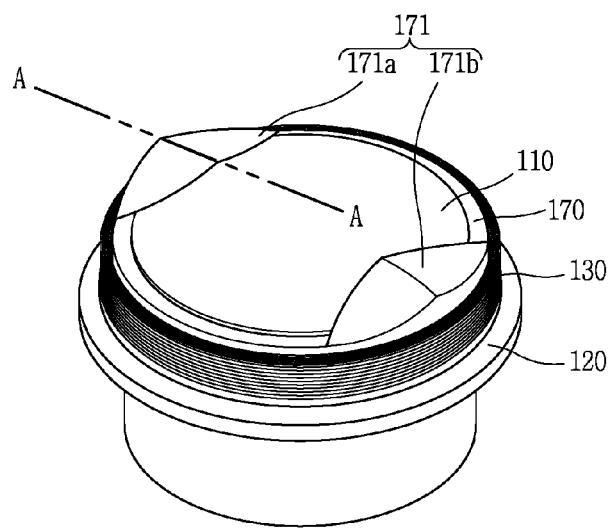
FIG. 7 is perspective view illustrating a camera module according to an embodiment of the present disclosure.
Figure 8:
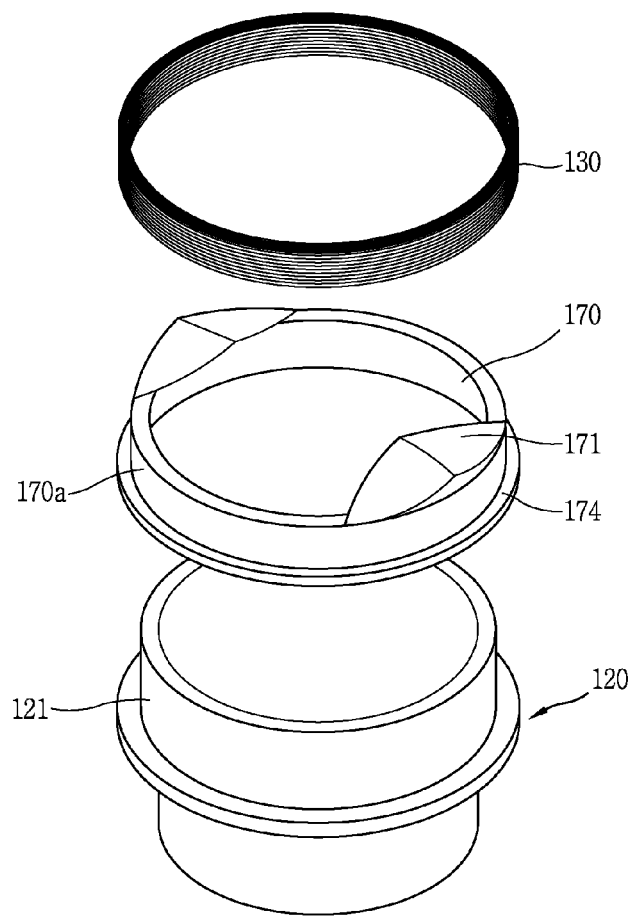
FIG. 8 is an exploded perspective view of FIG. 7.
Figure 9A:
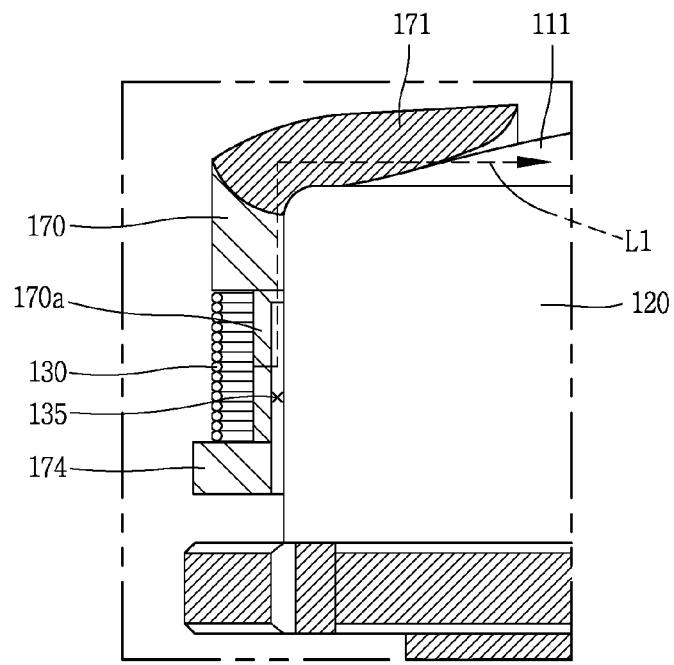
FIG. 9A is a cross-sectional view along line A-A in FIG. 7.
Figure 9B:
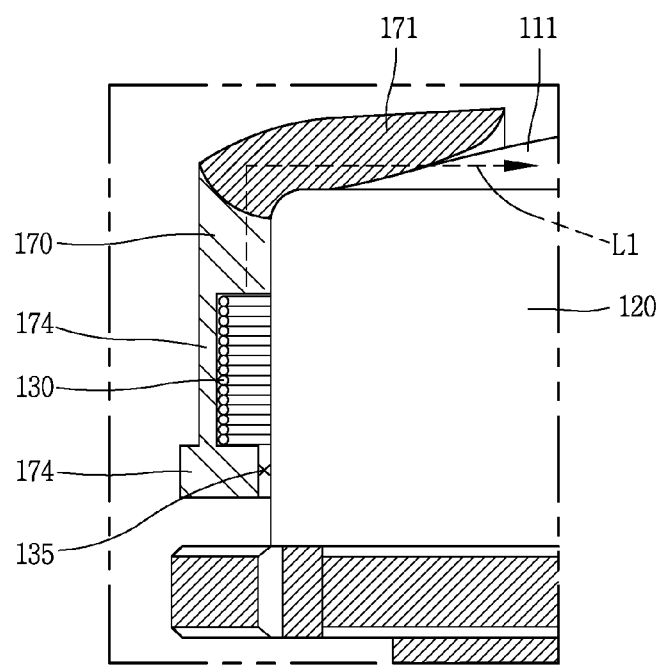
FIG. 9B is a view illustrating another embodiment of FIG. 9A.

FIG. 7 is a perspective view of the camera module 100 according to an embodiment of the present disclosure, and FIG. 8 is an exploded perspective view of FIG. 7, and FIG. 9A is a cross-sectional view taken along line A-A in FIG. 7, and FIG. 9B is a view illustrating another embodiment of FIG. 9A. Hereinafter, the heat transfer metal body 170 according to an embodiment of the present disclosure will be described with reference to FIGS. 7 through 9B. As illustrated in FIGS. 7 through 9B, the lens assembly 110 is inserted and accommodated into the lens barrel 120 having an upper portion in a cylindrical shape, and formed in an upward direction with a predetermined height. According to an embodiment of the present disclosure, the heat transfer metal body 170 is provided on an inner or outer side of the heat radiation member 130 to effectively transfer heat due to the heat radiation member 130 to the outermost lens 111. The heat transfer metal body 170 has a shape corresponding to an outer circumferential surface 121 of the heat radiation member 130 and lens barrel 120. For example, as illustrated in FIG. 8, the heat transfer metal body 170 may have a cylindrical shape. The heat radiation member 130 is formed on an outer circumferential surface 170*a* of the heat transfer metal body 170 in a contact manner to transfer heat generated from the heat radiation member 130 along the heat transfer metal body 170. Here, as illustrated in FIG. 3A, the outside region (B1) of the vertical field of view is larger than the outside region (B2) of the horizontal field of view, the heat transfer metal body 170 may be extended and formed to cover at least part of the outside region (B1) of the vertical field of view. In other words, the heat transfer metal body 170 may have a cylindrical shape, but a protrusion portion 171*a*, 171*b* may be formed on an upper end portion thereof to cover part of the outermost lens 111 (the outside region (B1) of the vertical field of view).

Furthermore, FIG. 9A illustrates a view in which the heat radiation member 130 is formed on an outside of the heat transfer metal body 170, but the present disclosure may not be necessarily limited to this. For example, as illustrated in FIG. 9B, the heat radiation member 130 may be formed to be brought into contact with an outer circumferential surface of the lens barrel 120. In other words, the heat radiation member 130 may be brought into contact with an inner circumferential surface of the heat transfer metal body 170 to transfer heat generated from the heat radiation member 130 to a surface of the outermost lens 111 along the heat transfer metal body 170. At this time, the heat radiation member 130 may be placed on a lower edge 174.

Here, an air gap 135 is formed between the lens barrel 120 and the heat transfer metal body 170. Heat generated from the heat radiation member 130 toward the lens barrel 120 may be reduced by the air gap 135 to move along the heat transfer metal body 170. L1 illustrated in FIGS. 9A and 9B exhibits a flow of heat transfer.

Here, a heat radiation member cover capable of covering the heat radiation member 130 is required for the heat transfer metal body 170 in FIG. 9A, but an additional member for surrounding the heat radiation member 130 is not required since the heat radiation member 130 is provided within the heat transfer metal body 170 in FIG. 9B. In FIG. 9B, the heat transfer metal body 170 also performs a function of the heat radiation member 130 that surrounds the heat radiation member 130. However, even in case of FIG. 9B, the protrusion portion 171 is formed on an upper surface of the heat transfer metal body 170 and thus advantageous in heat transfer.

The heat radiation member 130 is operated by the supply of power. To this end, according to an embodiment of the present disclosure, a power cable 131 electrically connected to a circuit board 160 provided within the camera module 100 is provided. In other words, FIG. 6A is a perspective view of the camera module 100 according to an embodiment of the present disclosure, and FIG. 6B is an exploded perspective view of FIG. 6A, and as illustrated in FIG. 6B, the heat radiation member 130 is electrically connected and operated to the circuit board 160 by the power cable 131, and a plurality of circuit boards 160 are disposed to be separated from each other at predetermined intervals within the camera module 100, and the circuit boards 160 are connected by a flexible circuit board 161 or flexible cable (not shown).

According to an embodiment of the present disclosure, the heat radiation member cover 140 performs a function of water-proof and moisture-proof of the heat radiation member 130 In other words, the heat radiation member cover 140 may prevent the heat radiation member 130 from being damaged due to foreign substances that can occur during driving and parking as well as climate environments such as rain, snow or the like.

Figure 6A:
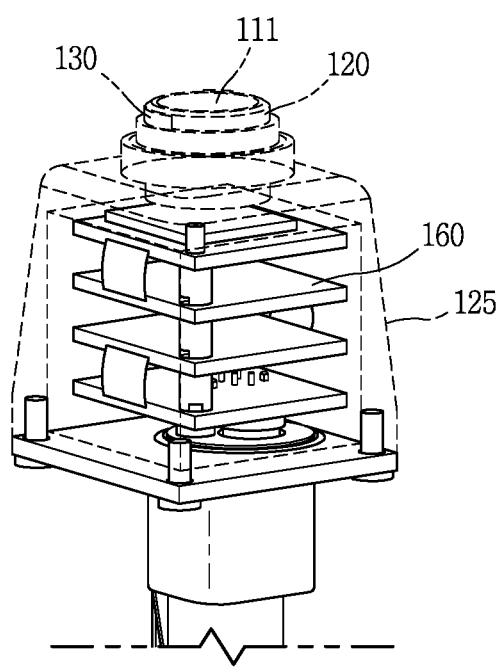
FIG. 6A is a perspective view illustrating a camera module according to an embodiment of the present disclosure.
Figure 6B:
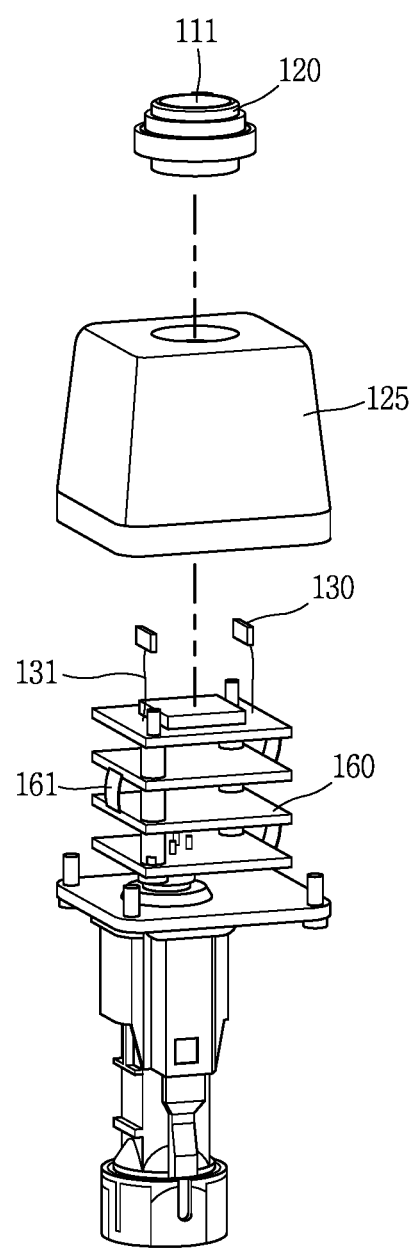
FIG. 6B is an exploded perspective view of FIG. 6A.

Here, FIGS. 6A and 6B illustrate the foregoing camera module 100 associated with FIGS. 10E and 10F.

Figure 11A:
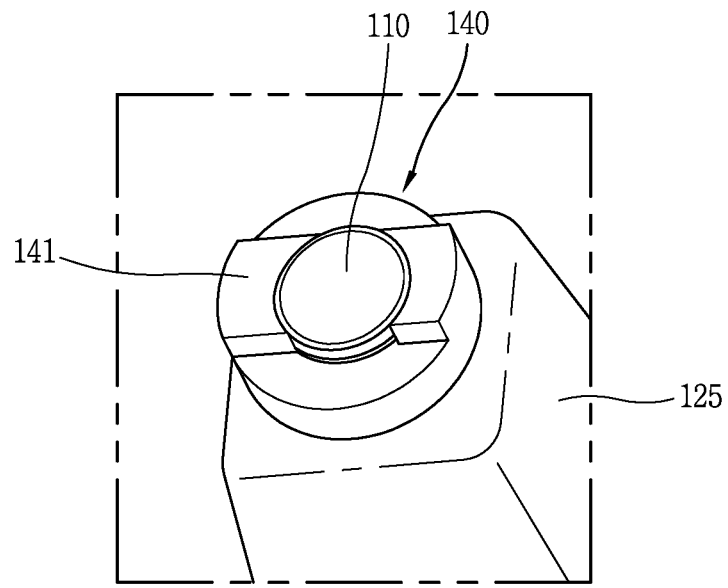
FIG. 11A is a perspective view illustrating a camera module according to an embodiment of the present disclosure.
Figure 11B:
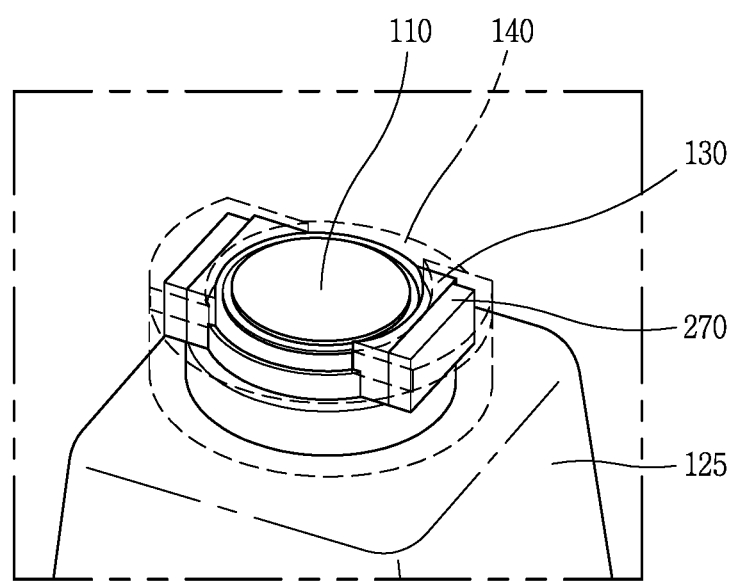
FIG. 11B is a perspective view of FIG. 11A.
Figure 11C:
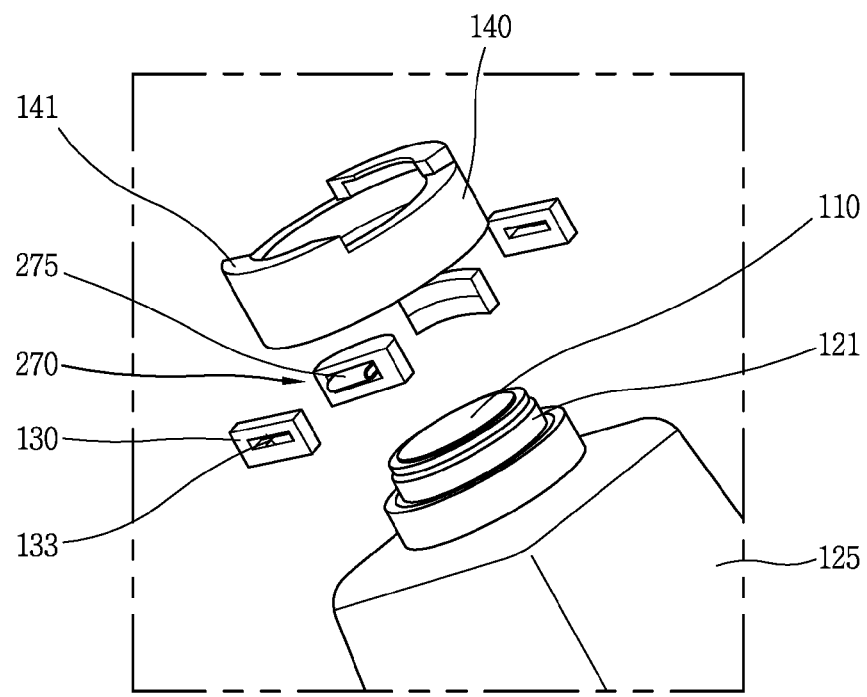
FIG. 11C is an exploded perspective view of FIG. 11A.
Figure 11D:
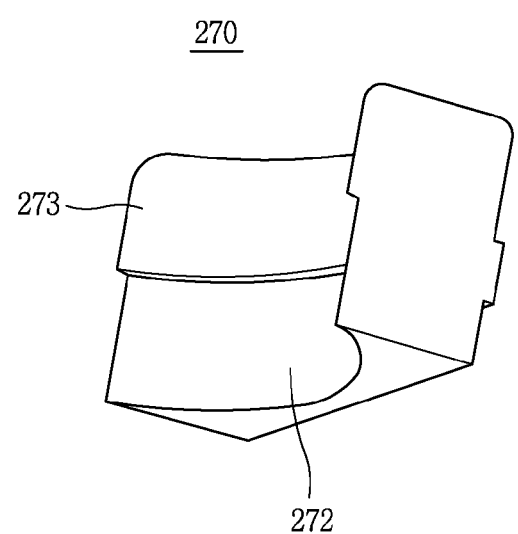
FIG. 11D is a perspective view of a heat transfer metal body.

FIG. 11A is a perspective view of the camera module 100 associated with another embodiment of the present disclosure, and FIG. 11B is a perspective view of FIG. 11A, and FIG. 11C is an exploded perspective view of FIG. 11A, and FIG. 11D is a perspective view of a heat transfer metal body 270 in FIG. 11C.

Referring to FIGS. 11A through 11D, the heat radiation member 130 is installed in a region adjacent to the outside region (B1) of the vertical field of view within the lens barrel 120, and the heat transfer metal body 270 is provided between the heat radiation member 130 and an outer circumferential surface 121 of the lens barrel 120. The heat transfer metal body 270 is provided in a region corresponding to the heat radiation member 130 on a rear surface of the heat radiation member 130 to have a shape corresponding to the heat radiation member 130. More specifically, as illustrated in FIG. 11D, the heat transfer metal body 270 is formed in a stepped manner to form a contact surface 272, 273 coupled to the outer circumferential surface 121 of the lens barrel 120. Furthermore, a hollow portion 133 is formed within the heat radiation member 130, and a bump 275 is formed on the heat transfer metal body 170 to allow the heat radiation member 130 to be more securely coupled to the heat transfer metal body 270. The heat transfer metal body 270 is formed of a metal to more effectively transfer heat generated from an inside and an outside of the heat radiation member 130 to the heat transfer metal body 170.

Here, the heat radiation member 130 may be disposed within the heat transfer metal body 270, but it is not illustrated in detail. In such a case, a protrusion portion 275 formed on the heat transfer metal body 270 is formed on an inner circumferential surface of the heat transfer metal body 270 to pass through the hollow portion 133 of the heat radiation member 130.

As illustrated in FIG. 11C, the heat radiation member 130 and heat transfer metal body 270 may be formed in a pair, and as illustrated in FIGS. 10A through 11D, they may be disposed to be separated by an angle of 90 degrees or formed toward a front direction.

Furthermore, the heat radiation member cover 140 is provided at an outside of the heat radiation member 130 to prevent heat due to the heat radiation member 130 from being dissipated to an outside thereof. The heat radiation member cover 140 is to prevent heat due to the heat radiation member 130 from being dissipated to the outside thereof, and thus a resin series such as plastic is preferable than a metal member.

The heat radiation member cover 140 is a ring-shaped cylinder since it should be formed to surround the heat transfer metal body 270 and heat radiation member 130 that surrounds the lens barrel 120. Here, an upper surface of the heat radiation member cover 140 is formed to cover the heat radiation member 130 and heat transfer metal body 270, and further protruded formed toward an upper portion in a region corresponding to a region disposed with the heat radiation member 130 and 270. A protrusion portion 141 protruded toward an upper portion as described above is formed adjacent to the outside region (B1) of the vertical field of view on the lens assembly 110 to guide heat due to the heat radiation member 130 to a more upper side thereof. It may be applicable to a case where a size of the vertical field of view is less than 180 degrees. The protrusion portion 141 may have a region corresponding to the heat radiation member 130 and heat transfer metal body 270. More specifically, the protrusion portion 141 may be provided at an upper side of the heat radiation member 130 and heat transfer metal body 270, and formed in a region overlapping with the heat radiation member 130 and heat transfer metal body 270. In this manner, when the protrusion portion 141 is formed not to have a portion in contact with the outermost lens 111, it may be possible to prevent foreign substances from being introduced between the outermost lens 111 and the protrusion portion 141.

Figure 12A:
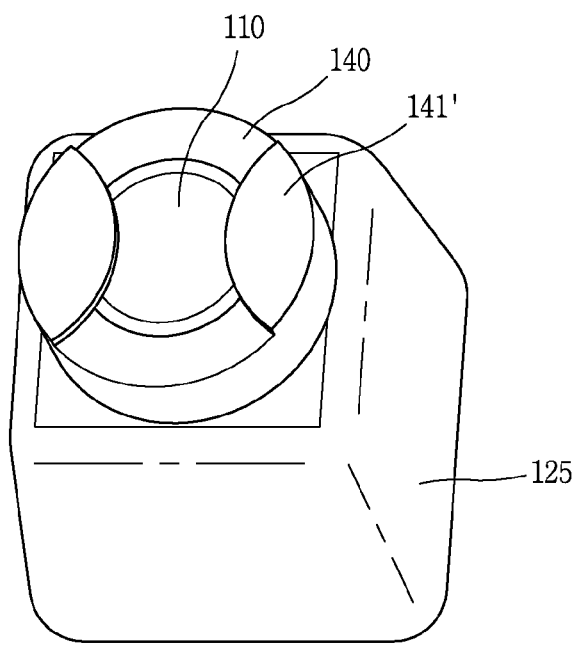
FIG. 12A is a perspective view illustrating a camera module according to an embodiment of the present disclosure.
Figure 12B:
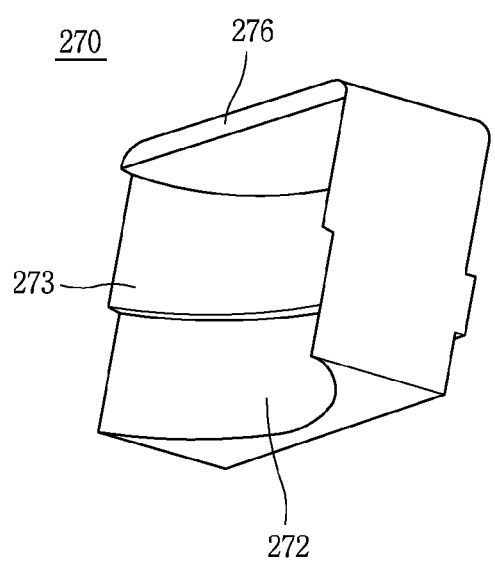
FIG. 12B is a perspective view of a heat transfer metal body.

On the other hand, FIG. 12A is a perspective view illustrating the camera module 100 according to an embodiment of the present disclosure, and FIG. 12B is a perspective view of the heat transfer metal body 270 in FIG. 12A. Referring to FIGS. 12A and 12B, it is similar to the camera module 100 illustrated in FIGS. 11A as through 11D excluding the shape of the heat transfer metal body 270 and the shape of a coil of the heat radiation member 130, and thus hereinafter, a difference from FIGS. 11A through 11D will be mainly described.

In FIGS. 12A and 12B, an upper surface portion 276 is formed on the heat transfer metal body 270 disposed on an inner circumferential surface of the heat radiation member 130. In other words, heat generated from the heat radiation member 130 is transferred to the outermost lens 111 through the upper surface portion 276 of the heat transfer metal body 270. In this manner, the upper surface portion 276 formed toward the center of the outermost lens 111 from the heat transfer metal body 270 is protruded and formed on the heat transfer metal body 270. The upper surface portion 276 is formed at a portion adjacent to the outside region (B1) of the vertical field of view within the outermost lens 111 and disposed adjacent to the outermost lens 111 without blocking an eyesight of the lens assembly 110. Here, as illustrated in FIG. 12A, a protrusion portion 141' for hiding the upper surface portion 276 is formed on the heat radiation member cover 140. The protrusion portion 141' is formed to cover an upper portion of the lens assembly 110 in a substantially semi-circular shape.

Figure 13:
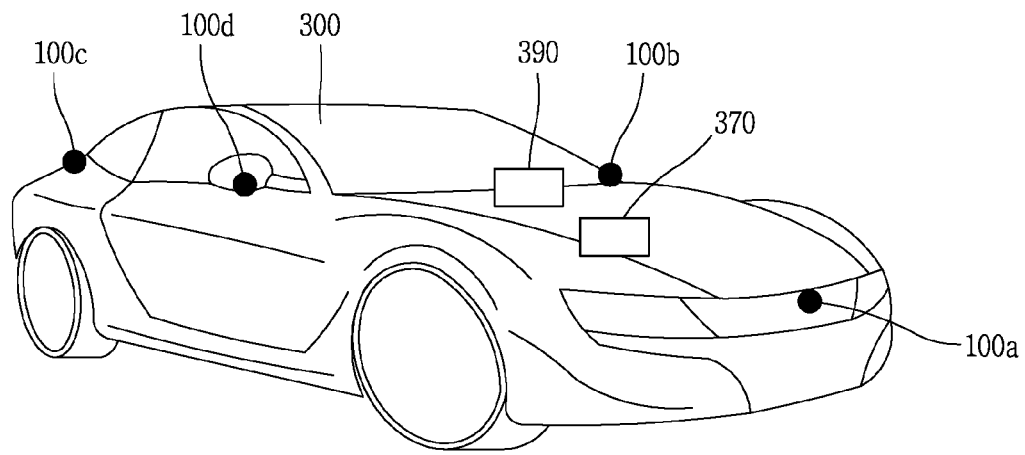
FIG. 13 is a perspective view illustrating a vehicle mounted with a camera module associated with an embodiment of the present disclosure.

On the other hand, the camera module 100 according to an embodiment of the present disclosure may be mounted and used on a body such as a vehicle 300. FIG. 13 is a view for explaining the mounting position of the camera module 100 according to an embodiment of the present disclosure, and FIG. 14 is a view for explaining a field of view of the camera module 100 in FIG. 13.

Figure 14:
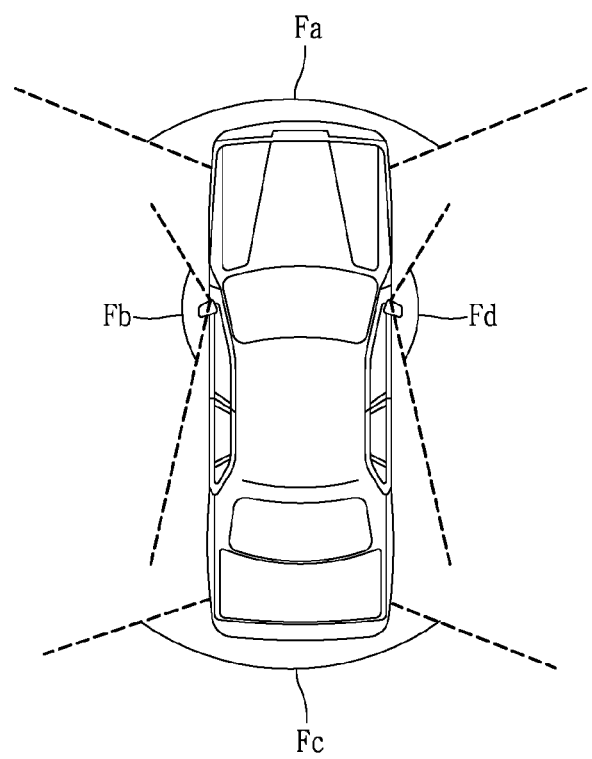
FIG. 14 is a view for explaining a field of view in FIG. 13.

As illustrated in FIGS. 13 and 14, the camera module 100a, 100b, 100c, 100d according to an embodiment of the present disclosure may be formed on a front, a rear, a left and a right side of the vehicle 300, and have fields of view (Fa, Fb, Fc, Fd), respectively. Though it is shown in FIG. 14 that a field of view of the camera module 100 is less than 180 degrees, it is expressed in an exaggerated manner, and may be applicable to a wide-angle camera module 100 in which the field of view is above 180 degrees as well as the camera module 100 in which the field of view is less than 180 degrees.

The camera modules 100 may be controlled by an electronic control unit (ECU) 370 provided within the vehicle 300. For example, the temperature (T1) and humidity (H1) of the vehicle 300 may be measured by a temperature/humidity sensor 390 provided in the vehicle 300 and a temperature sensor (not shown) provided in the camera module 100 to prevent dew condensation from being generated from the camera module 100 or removing dew condensation that has been already generated by the temperature (T1) and humidity (H1) of the vehicle 300 and the temperature (T2) measured from the camera module 100. Here, data acquisition by the temperature/humidity sensor 390 is obtained by Controller Area Network (CAN) communication.

Figure 15:
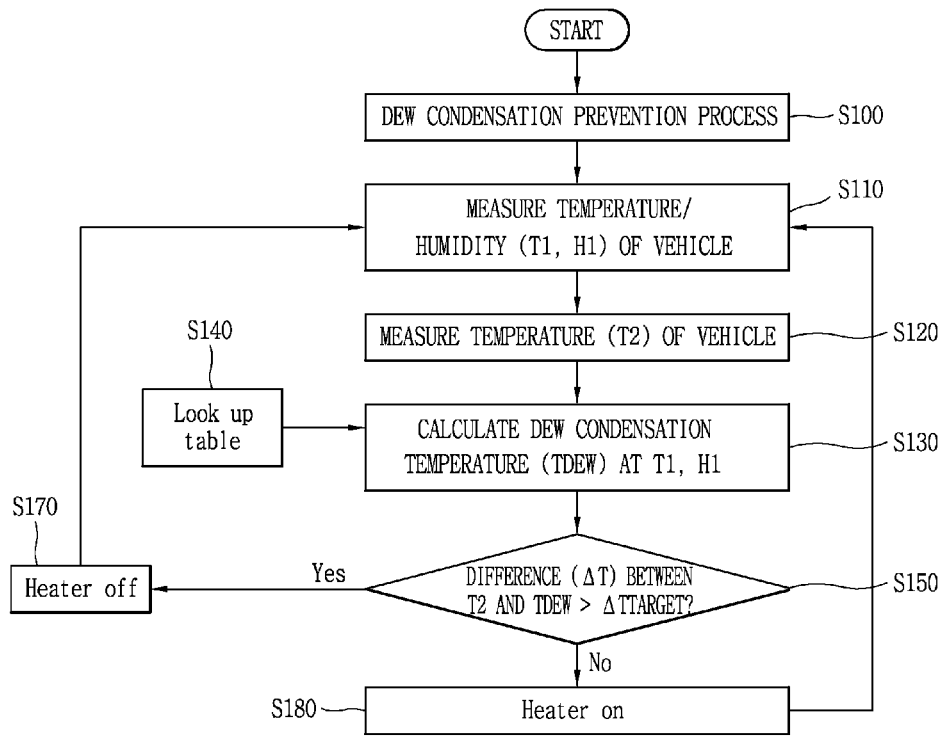
FIG. 15 is a flow chart illustrating a dew condensation prevention system according to an embodiment of the present disclosure.
Figure 16:
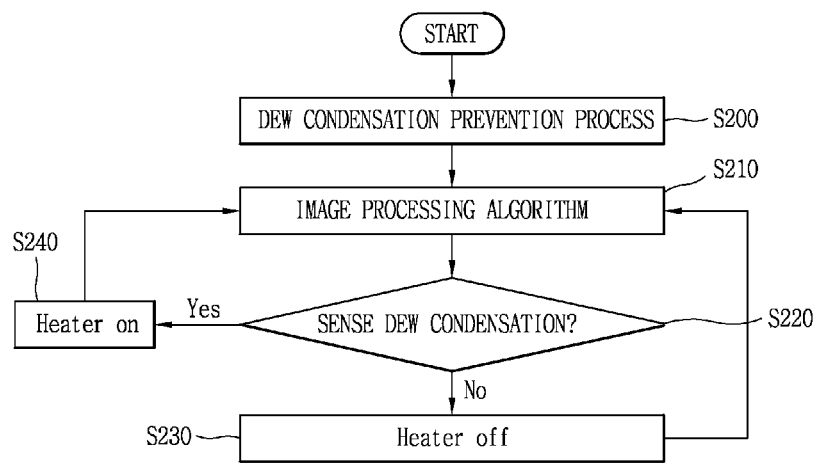
FIG. 16 is a flow chart illustrating a dew condensation prevention system according to another embodiment of the present disclosure.

FIG. 15 is a view associated with a dew condensation prevention system according to an embodiment of the present disclosure, and FIG. 16 is a view associated with a dew condensation prevention system according to another embodiment of the present disclosure.

First, the process (S100) of preventing dew condensation from being generated on the lens assembly 110 of the camera module 100 will be described. The generation of dew condensation on the camera module 100 mainly occurs when driving in an external environment such as falling rain or snow or moving to a closed inner space such as an underground parking lot while driving outside.

The temperature (T1) and humidity (H1) around the vehicle 300 is measured (S110) by the temperature/humidity sensor 390 provided within the vehicle 300 while at the same time the temperature (T2) of the camera module 100 is measured (S120) by the temperature sensor of the camera module 100. A dew condensation temperature (Tdew) on the camera module 100 is calculated (S130) by the measured temperature (T1) and humidity (H1) around the vehicle 300 and the measured temperature (T2) of the camera module 100. It is calculated (S140) by a look-up table embedded in the electronic control unit 370. The look-up table is a database in which temperature and humidities at which dew condensation is generated are shown in advance using a psychometric chart.

Here, the temperature (H1) on the camera module 100 and the dew condensation temperature (Tdew) may be different, and whether or not a difference (ΔT) between the temperature (T2) of the camera module 100 and the dew condensation temperature (Tdew) is within a range of a preset temperature difference (ΔTtarget) is determined (S150). If the difference (ΔT) between the temperature (T2) of the camera module 100 and the dew condensation temperature (Tdew) is greater than the preset temperature difference (ΔTtarget), the heat radiation member 130 operates (S180), and when the difference (ΔT) between the temperature (T2) of the camera module 100 and the dew condensation temperature (Tdew) is less than the preset temperature difference (ΔTtarget), the operation of the heat radiation member 130 stops (S190).

For example, when a vehicle enters an underground parking lot at 20° C. while driving at an ambient temperature of 5° C., dew condensation may be generated on a surface of the lens assembly 110 of the camera module 100 by a difference between a temperature (T2) on a surface of the camera module 100 and a temperature (T1) in the vicinity of the vehicle 300, namely, underground parking lot. At this time, when a dew condensation temperature (Tdew) on the camera module 100 is 15° C., a difference (ΔT) between the temperature (T2) of the camera module 100 and the dew condensation temperature (Tdew) becomes 10° C. Here, the ΔT has a value of (Tdew−T2).

If the preset temperature difference (ΔTtarget) is set to 1° C., then a difference between the temperature of the camera module 100 and the dew condensation temperature (Tdew) is greater than a preset temperature difference, and thus in this case, the heat radiation member 130 operates. If a surface temperature of the lens assembly 110 is continuously increased by the heat radiation member 130, and a difference between the temperature (T2) of the camera module 100 and the dew condensation temperature (Tdew) is within a range of the preset temperature difference (ΔTtarget), the operation of the heat radiation member 130 stops. As described above, according to an embodiment of the present disclosure, a difference between an ambient temperature and a temperature of the outermost lens 111 may be reduced to prevent dew condensation from being generated.

Here, the preset temperature difference (ΔTtarget) denotes a minimum difference between the temperature (T2) of the camera module 100 and the dew condensation temperature (Tdew) to operate the heat radiation member 130. Furthermore, when the preset temperature difference (ΔTtarget) has a negative (−) value, the heat radiation member 130 may operate when the temperature (T2) of the camera module 100 is less than an ambient dew condensation temperature (Tdew).

On the other hand, in a state that the start-up of the vehicle 300 is turned off when the vehicle 300 is parked outside in winter or during snow or rain falling, the dew condensation prevention process may not operate. In this case, dew condensation may be generated on the lens assembly 110 of the camera module 100. According to an embodiment of the present disclosure, it may be possible to operate a dew condensation removal process (S200) to remove dew condensation that has been already generated.

Hereinafter, a dew condensation removal process will be described with reference to FIG. 16.

First, an image processing unit (not shown) provided within the camera module 100 is operated (S210) to determine whether or not dew condensation is generated on the camera module 100 (S220). If dew condensation is generated on the camera module 100, then the heat radiation member 130 is operated (S240) to remove all the dew condensation generated on the camera module 100, and if it is checked by the image processing unit that all the generated dew condensation is removed, then the operation of the heat radiation member 130 stops (S230).

In the above, a case where the camera module 100 according to an embodiment of the present disclosure is mounted and used on the vehicle 300 has been described, but the present disclosure may not be necessarily limited to this, and may be also applicable to a surveillance camera provided at an outside.

The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A camera module, comprising:
    a lens assembly having an outermost lens, the lens assembly having a field-of-view region defined by a first field-of-view extending in a first direction and a second field-of-view extending in a second direction crossing the first direction, and at least one of the first field-of-view and the second field-of-view being greater than 180 degrees;
    a lens barrel configured to accommodate the lens assembly;
    a heat radiation member located along an outer surface of the lens barrel to transfer heat to the outermost lens of the lens assembly;
    a circuit board located within the camera module; and
    a connection cable connecting the heat radiation member to the circuit board to provide power to the heat radiation member.

2. The camera module of claim 1, wherein a size of the first field of view is equal to or greater than a size of the second field of view.

3. The camera module of claim 2, wherein the heat radiation member is located adjacent to the outermost lens of the lens assembly such that the heat radiation member does not extend over the field-of-view region.

4. The camera module of claim 3, wherein the heat radiation member is located adjacent to the field-of-view region in both the first direction and the second direction.

5. The camera module of claim 3, wherein the heat radiation member is located adjacent to the field-of-view region in only the second direction.

6. The camera module of claim 1, further comprising a heat transfer body located at an inner side or an outer side of the heat radiation member, the heat transfer body being configured to transfer heat from the heat radiation member to the outermost lens.

7. The camera module of claim 6, wherein the heat transfer body is located at the outer side of the heat radiation member, and the heat transfer body has a bump located at an inner surface of the heat transfer body facing the heat radiation member, and
    wherein the heat radiation member has a recess at the outer side to receive the bump.

8. The camera module of claim 7, wherein an exterior surface of the heat transfer body is exposed, and
    wherein the heat transfer body surrounds the outer side of the heat radiation member.

9. The camera module of claim 8, wherein a protrusion portion is located on the heat transfer body to cover an edge of the field-of-view region extending in the second direction.

10. The camera module of claim 6, wherein the heat transfer body is provided at the inner side of the heat radiation member, and the heat transfer body has a bump formed at an outer surface of the heat transfer body facing the heat radiation member, and wherein the heat radiation member has a recess at the inner side to receive the bump.

11. The camera module of claim 10, wherein a protrusion portion is located on the heat transfer body to cover an edge of the field-of-view region extending in the second direction.

12. The camera module of claim 11, further comprising a cover surrounding an exterior of the heat radiation member, the cover including a protrusion portion extending toward a center of the outermost lens.

13. The camera module of claim 11, wherein the protrusion portion of the cover is located at the edge of the field-of-view region extending in the second direction.

14. The camera module of claim 6, wherein an air gap is formed between the lens barrel and the heat transfer body.

15. The camera module of claim 1, wherein the heat radiation member is a heating coil.

16. A dew condensation prevention system for a camera module, the camera module including an outermost lens, a temperature sensor to measure a temperature of the outermost lens, and a heat radiation member to transfer heat to the outermost lens, the system comprising:
a body mounted with the camera module, the body having a temperature/humidity sensor; and
a controller configured to:
obtain, from the temperature/humidity sensor, a first temperature ($T_1$) and a first humidity ($H_1$) from an environment around the body;
obtain, from the temperature sensor of the camera module, a second temperature ($T_2$) of the camera module; and
calculate a dew point temperature ($T_{dew}$) based on the first temperature ($T_1$), the first humidity ($H_1$) and the second temperature ($T_2$) to determine whether to operate the heat radiation member,
wherein in determining whether to operate the heat radiation member, the controller is configured to:
calculate a difference ($\Delta T$) between the second temperature ($T_2$) and the dew point temperature ($T_{dew}$); and
compare the calculated difference ($\Delta T$) to a preset temperature difference ($\Delta T_{target}$).

17. The dew condensation prevention system of claim 16, wherein the controller is configured to operate the heat radiation member when the calculated difference ($\Delta T$) is greater than the preset temperature difference ($\Delta T_{target}$), and the controller is configured to not operate the heat radiation member when the calculated difference ($\Delta T$) is less than the preset temperature difference ($\Delta T_{target}$).

18. The dew condensation prevention system of claim 16, wherein the controller is configured to:
detect dew condensation on the outermost lens by operating an image processing unit provided in the camera module; and
operate the heat radiation member when dew condensation is detected.

* * * * *